(12) United States Patent
Bendel et al.

(10) Patent No.: US 10,108,623 B2
(45) Date of Patent: Oct. 23, 2018

(54) MERGING DATABASE OPERATIONS FOR SERIALIZABLE TRANSACTION EXECUTION

(71) Applicant: International Business Machines Corporation, Armonk, NY (US)

(72) Inventors: Peter Bendel, Holzgerlingen (DE); Oliver Benke, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 14/568,914

(22) Filed: Dec. 12, 2014

(65) Prior Publication Data

US 2016/0171002 A1  Jun. 16, 2016

(51) Int. Cl.
*G06F 17/30* (2006.01)
*G06F 7/00* (2006.01)

(52) U.S. Cl.
CPC ...... *G06F 17/30082* (2013.01); *G06F 17/303* (2013.01); *G06F 17/3023* (2013.01); *G06F 17/30309* (2013.01); *G06F 17/30339* (2013.01); *G06F 17/30348* (2013.01); *G06F 17/30371* (2013.01); *G06F 17/30377* (2013.01); *G06F 17/30979* (2013.01)

(58) Field of Classification Search
CPC ........... G06F 17/30082; G06F 17/3023; G06F 17/30979; G06F 17/30348; G06F 17/30371; G06F 17/30377; G06F 17/303; G06F 17/30309; G06F 17/30339
USPC ........................................................ 707/714
See application file for complete search history.

(56) References Cited

U.S. PATENT DOCUMENTS

| 5,983,225 | A  | * | 11/1999 | Anfindsen ......... G06F 17/30362 |
| 6,618,719 | B1 | * | 9/2003  | Andrei .............. G06F 17/30471 |
| 7,904,427 | B2 |   | 3/2011  | Lomet |
| 8,010,497 | B2 |   | 8/2011  | Verma et al. |

(Continued)

OTHER PUBLICATIONS

Bendel, et al., "Merging Database Operations for Serializable Transaction Execution", U.S. Appl. No. 14/919,812, filed Oct. 22, 2015.

(Continued)

*Primary Examiner* — Kuen S Lu
(74) *Attorney, Agent, or Firm* — Daniel R. Simek

(57) ABSTRACT

A method for merging transactions for execution by a database management system. The method includes a computer processor receiving a database query that is comprised of a plurality of transactions. The method further includes a computer processor placing each of the plurality of transactions, of the database query, in respective chronological order, in a scheduling queue. The method further includes a computer processor determining that at least a first transaction and a second transaction within the plurality of transactions each contains one or more transaction delineation descriptions. The method further includes computer processor responding to the determination that the first transaction and the second transaction, within the plurality of transactions, each contains one or more transaction delineation descriptions, and merging the first transaction and the second transaction to create a merged transaction combination and merging also includes combining two or more table-scan operations.

10 Claims, 7 Drawing Sheets

(56) References Cited

U.S. PATENT DOCUMENTS

| | | | |
|---|---|---|---|
| 8,266,122 B1* | 9/2012 | Newcombe | G06F 17/30309 |
| | | | 707/695 |
| 8,396,831 B2 | 3/2013 | Larson et al. | |
| 8,495,110 B2 | 7/2013 | Aronovich et al. | |
| 8,527,501 B2 | 9/2013 | Horii | |
| 8,752,054 B2 | 6/2014 | Bentley et al. | |
| 9,633,051 B1* | 4/2017 | Maccanti | G06F 17/30289 |
| 2009/0083292 A1* | 3/2009 | Bhattacharjee | G06F 17/30595 |
| 2011/0302143 A1 | 12/2011 | Lomet | |
| 2014/0279299 A1 | 9/2014 | Erenrich | |

OTHER PUBLICATIONS

Cahill, et al., "Serializable Isolation for Snapshot Databases", SIGMOD '08, Jun. 9-12, 2008, © 2008 ACM, <http://cs.nyu.edu/courses/fall12/CSCI-GA.2434-001/p729-cahill.pdf>.

Fekete, Alan, "Snapshot Isolation and Serializable Execution", University of Sydney (Australia), <http://sydney.edu.au/engineering/it/~fekete/teaching/serializableSI-Fekete.pdf>.

IBM Knowledge Center, "Scan sharing improves concurrency", <http://pic.dhe.ibm.com/infocenter/db2luw/v9r7/index.jsp?topic=%2Fcom.ibm.db2.luw.wn.doc%2Fdoc%2Fc0053641.html>.

Turner, et al., "Using a Transaction Definition Language for the Automated ARMing of Web Services", High Performance Systems Group, University of Warwick, Coventry, UK.

* cited by examiner

```
Connection con = DriverManager.getConnection("jdbc:db2..."); ~200
201 — con.setAutoCommit(false);
202 — // Transaction Delineation Descriptions: R(TEST.TESTTAB) o W(TEST.TESTTAB) C
                                                     203           204  205        206
Statement stmt = con.createStatement();
ResultSet rs = stmt
.executeQuery(" SELECT COUNT(*) AS COUNT FROM TEST.TESTTAB WHERE AVAILABLE=1");
                                                                              210
int numAvailable = 0;
if (rs.next()) {
    numAvailable = rs.getInt("COUNT");
}
System.out.println("The count is " + numAvailable);
if (numAvailable > 2) {                                                    212
    stmt.executeUpdate(" UPDATE TEST.TESTTAB SET AVAILABLE=0 WHERE NAME=?");
}
con.commit ();
    214
```

FIG. 2

| STEP | ACTION / OPERATION |
|---|---|
| 1 | START OF T1 |
| 1a | T1.READ(A1) |
| 2 | T1.READ(A2) |
| 3 | T1.O WRITE(A1) |
| 3a | START OF T3 |
| 3b | START OF T4 |
| 4 | T1.O WRITE(A2) |
| 5 | T1.O WRITE(A3) MERGED WITH T3.READ(A3)  T1.O COMMIT [ALL T1 OPERATIONS] ~ 501 |
| 6 | T3.O WRITE(A2) MERGED WITH T4.READ(A2)  T3.O COMMIT [ALL T3 OPERATIONS] ~ 502 |
| 7 | T4.O WRITE(A2) ~ 503 |
| 8 | T4.O COMMIT |

FIG. 5a

| STEP | ACTION / OPERATION |
|---|---|
| 1 | START OF T1 |
| 1a | T1.READ(A1) |
| 2 | T1.READ(A2) |
| 3 | T1.O WRITE(A1) |
| 3a | START OF T3 |
| 3b | START OF T4 |
| 4 | T1.O WRITE(A2) MERGED WITH T4.READ(A2) [DELAY FURTHER EXECUTION IN T4 UNTIL T1.O COMMIT INITIATED] ~520 ~523 |
| 5 | T1.O WRITE(A3) MERGED WITH T3.READ(A3) [DELAY FURTHER EXECUTION IN T3 UNTIL T1.O COMMIT INITIATED] ~525 ~522 |
| 6 | T1.COMMIT [ALLOWS T3 AND T4 TO CONTINUE] |
| 7 | T3.O WRITE(A2) |
| 8 | T4.O WRITE(A2) |
| 9 | T3.O COMMIT |
| 10 | T4.O COMMIT |

FIG. 5b

MERGING DATABASE OPERATIONS FOR SERIALIZABLE TRANSACTION EXECUTION

BACKGROUND OF THE INVENTION

The present invention relates generally to the field of databases, and more particularly to transaction control within a database management system (DBMS).

Databases are critical pieces of the IT infrastructure required by businesses, organizations, and government function of virtually any size. Databases act as a central repository of information and eliminate the laborious task of searching for information within hardcopy files that have fixed locations or electronic files which only contain portions of the information. Databases allow the user to not only access information but also work with the information stored within the database. Access to databases can occur locally or by using the Internet or wireless technologies (e.g., smartphones). Databases can be accessed from virtually anywhere in the world. Databases have grown from repositories of information for a single individual or business to data warehousing, handling a plurality of information (e.g., photographs, personal information, news articles, medical information, etc.). For example, e-commerce, on-line banking, and on-line brokerage account applications make extensive use of databases. Guaranteeing the security and integrity (e.g., reliability) of the transactions and the effect those transactions have on the data within a database is important.

Computer science outlines a set of properties that guarantee that database transactions are processed reliably. These properties are atomicity, consistency, isolation, and durability (ACID). Atomicity requires that each transaction be "all or nothing"; if one part of a transaction fails, the entire transaction fails, and the state of the database is left unchanged. Consistency ensures that any transaction will bring the database from one valid state to another. Any data written to the database must be valid according to all defined rules, including constraints, cascades, triggers, and any combination thereof. Examples of consistency implementations are that any transactions started in the future necessarily see the effects of other transactions committed in the past; that database constraints are not violated, particularly once a transaction commits; and that operations in transactions are performed accurately, correctly, and with validity with respect to application semantics. Isolation ensures that the concurrent execution of transactions results in a system state that would be obtained if transactions were executed serially (e.g., one after the other). Providing isolation is the main goal of concurrency control. Using concurrency control methods, the effects of an incomplete transaction are not visible to another transaction. Durability means that once a transaction has been committed, it will remain so, even in the event of power loss, crashes, or errors. For example, transactions and/or their effects are recorded in a non-volatile memory.

Database management systems (DBMS) employ various methods (e.g., locking, multi-version concurrency control (MVCC), etc.) to provide ACID capabilities for transactions and ensure ACID compliance. Multi-version concurrency control (MCC or MVCC) of a database provides each read transaction the prior, unmodified version of data that is being modified by another active transaction. When an MVCC database needs to update an item of data, it will not overwrite the old data with new data but instead mark the old data as obsolete and add the newer version elsewhere. Thus, there are multiple versions stored but only one version is the latest. Snapshot isolation is implemented within MVCC. Snapshot isolation is a guarantee that all reads made in a transaction will see a consistent snapshot of the database, and the transaction itself will successfully commit only if no updates it has made conflict with any concurrent updates made since that snapshot. Read transactions under MVCC typically use a timestamp or transaction ID to determine what state of the database to read and read these versions of the data. This avoids managing locks for read transactions because writes can be isolated by virtue of the old versions being maintained, rather than through a process of locks or mutexes. This allows read transactions to access the data that was present when they began reading, even if it was modified or deleted part way through by some other write transaction. Writes affect a future version, but at the transaction ID (e.g., timestamp) that the read is working at, everything is guaranteed to be consistent because the writes are occurring at a later transaction ID. MVCC requires (generally) the system to periodically sweep through and delete the old, obsolete data objects.

SUMMARY

According to an aspect of the present invention, there is a method, computer program product, and/or system for merging transactions for execution by a database management system. The method includes one or more computer processors receiving a database query that is comprised of a plurality of transactions. The method further includes one or more computer processors placing each of the plurality of transactions of the database query in respective chronological order in a scheduling queue. The method further includes one or more computer processors determining that at least a first transaction and a second transaction within the plurality of transactions each contain one or more transaction delineation descriptions. The method further includes one or more computer processors responding to the determination that the first transaction and the second transaction each contain one or more transaction delineation descriptions. The method further includes one or more computer processors merging the first transaction and the second transaction to create a merged transaction combination and merging includes combining two or more table-scan operations.

BRIEF DESCRIPTION OF THE DRAWINGS

FIG. 2 depicts a sample database query, created incorporating transaction delineation definitions, in accordance with an embodiment of the present invention.

FIG. 5a depicts a table of the operational steps of a merged transaction combination based on a merge algorithm, in accordance with an embodiment of the present invention.

FIG. 5b depicts a table of the operational steps of a merged transaction combination based on another merge algorithm, in accordance with an embodiment of the present invention.

DETAILED DESCRIPTION

Figure 1:
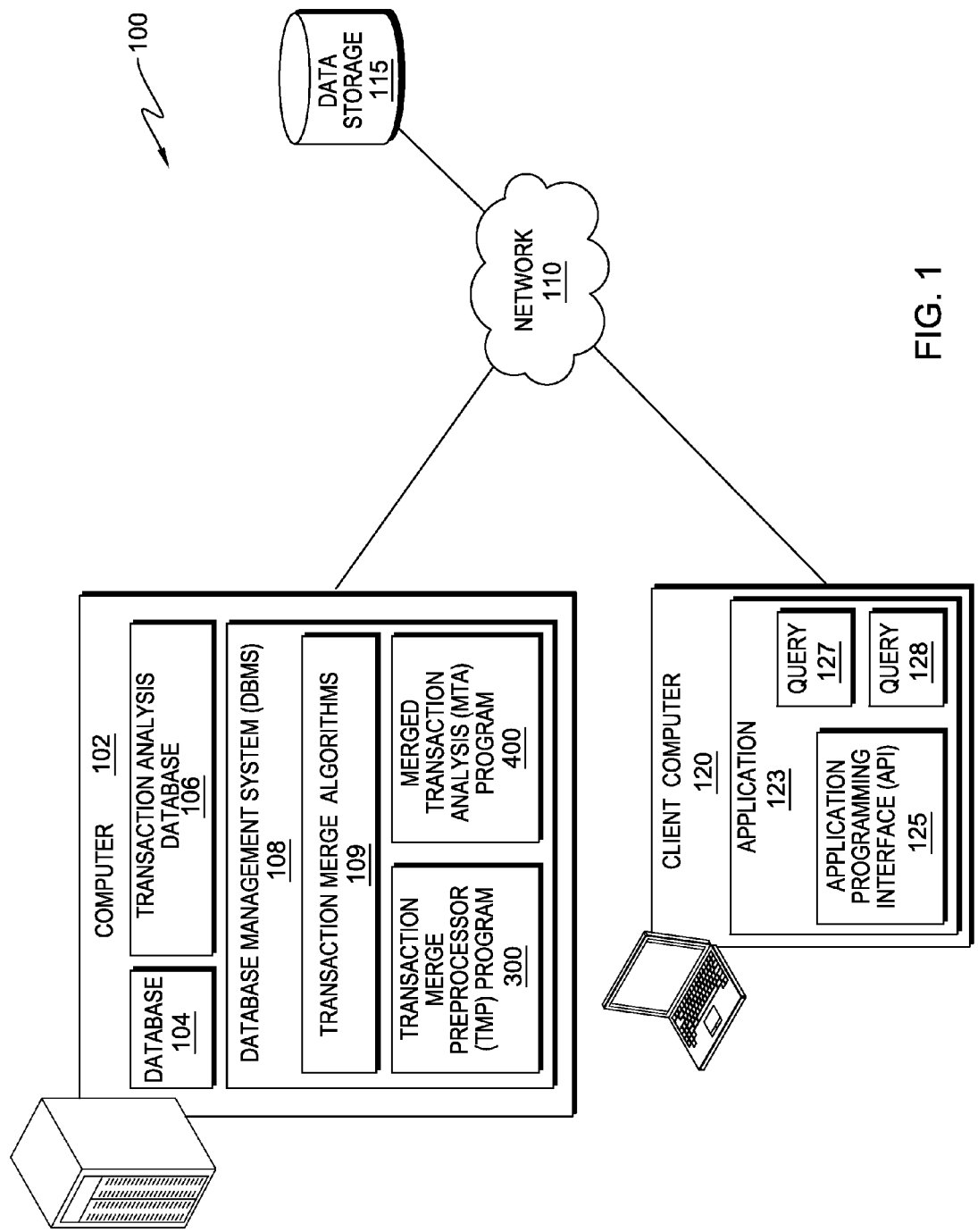
FIG. 1 illustrates a distributed data processing environment, in accordance with an embodiment of the present invention.

Traditionally, a desktop personal computer (PC) or mainframe terminal was used to store a database and process queries directed to the database. Today, with the continuous increase in processing power, the simplification of user interactions via application programming interface (API), the constant decreasing size of electronic devices, and the spread of distributed computing systems, a user can now access data worldwide with a smart-phone or even smaller computing devices. E-commerce providers are just one of the beneficiaries of the improvements in databases and other technologies. However, more and more data is being constantly created and accessed, dramatically growing the size of databases from megabytes to gigabytes, terabytes, petabytes, and beyond. This increase in the size of databases requires the increased processing power of distributive computing systems, such as massively parallel computer (MPP) and grid/cluster computing for various applications.

Embodiments of the present invention recognize that merging transactions within a database query produces increased efficiency for databases using MVCC as part of the transaction management system. Database management systems (DBMS) employ various techniques to provide ACID capabilities for transactions and ensure ACID compliance. Within the "isolation" portion of ACID capabilities for transaction controls, there are different levels of isolation. Standard isolation levels include read uncommitted, read committed, repeatable reads, and serializable. A lower isolation level increases the ability of many users to access data at the same time but increases the number of concurrency effects (such as dirty reads or lost updates) users might encounter. Conversely, a higher isolation level (e.g., serializable) reduces the types of concurrency effects that users may encounter but requires more system resources and increases the chances that one transaction will block another. For large databases that are processed by MPP, cluster, and cloud computing systems, the system resources are significant. The database is distributed across a plurality of "nodes" (e.g., physical or virtualized computing systems). The distribution of the database across the plurality of nodes speeds up access to information within the database (e.g., database queries, queries). For some databases comprised of structured data and simpler queries, the use of indexes can avoid table scans for many workloads. A table scan is the reading of every row in a database table. Some DBMSs work without any indexes to reduce complexity for tuning (e.g., optimize and homogenize the database, database design, query optimization) resulting in those DBMSs performing table scans in situations other databases could make use of an index. This can be effective if the workload is mostly of analytical or reporting nature, where table scans are often difficult to avoid. The order that the index definition defines the columns in is important. It is possible to retrieve a set of row identifiers using only the first indexed column. It is not possible or efficient (on most databases) to retrieve the set of row identifiers using only the second or greater indexed column. Aggregation of data and locating information within unstructured data is more easily implemented without the use of database indexing. As business models migrate to big-data and analytics, with a focus on near real-time data access, DBMS's increasingly rely on massively parallel processing (MPP) and MVCC to handle the increased demands on databases. Merging query transactions without incurring roll-backs or aborts, which generate additional table scans, is enabled by embodiments of the present invention.

The present invention will now be described in detail with reference to the Figures. FIG. 1 is a functional block diagram illustrating distributed data processing environment 100, in accordance with an embodiment of the present invention. An embodiment of distributed data processing environment 100 includes computer 102, client computer 120, and data storage 115, all interconnected over network 110. Many modifications to the depicted environment may be made by those skilled in the art without departing from the scope of the invention as recited by the claims.

In certain embodiments, computer 102 represents a computer system utilizing clustered computers and components (e.g., database server computers, application server computers, etc.) that act as a single pool of seamless resources when accessed through network 110, as is common in data centers, in massively parallel processing (MPP) environments and in cloud-computing applications. In general, computer 102 is representative of any programmable electronic device or combination of programmable electronic devices capable of executing machine readable program instructions and communicating with client computers, such as client computer 120 or data storage 115 via network 110. In other embodiments, computer 102 may be a laptop computer, a tablet computer, a netbook computer, a personal computer (PC), a desktop computer, a personal digital assistant (PDA), a smart phone, or any programmable computer system known in the art. Computer 102 may include components as depicted and described in further detail with respect to FIG. 6, in accordance with embodiments of the present invention.

In various embodiments, computer 102, client computer 120, and data storage 115 communicate through network 110. Network 110 can be, for example, a local area network (LAN), a telecommunications network, a wide area network (WAN) such as the Internet, or any combination of the three, and can include wired, wireless, or fiber optic connections. In general, network 110 can be any combination of connections and protocols that will support communications between client computer 120, computer 102, and data storage 115, in accordance with embodiments of the present invention.

Computer 102 includes database 104, transaction analysis database 106, database management system (DBMS) 108, transaction merge algorithms 109, and various system and database monitoring programs (e.g., cycle and dependency graph calculations) (not shown). In one embodiment of the present invention, database management system (DBMS) 108 includes transaction merge preprocessor (TMP) program 300 and merged transaction analysis (MTA) program 400.

Database 104, located on computer 102, contains information that client computer 120 accesses via network 110. For example, database 104 contains census information, query 127 targets economic information, and query 128 studies health care trends.

Transaction analysis database 106 contains information used by DBMS 108 and programs/functions associated with various embodiments. Transaction analysis database 106 contains information related to a query in process by TMP program 300. For example, a copy of the current query, a listing of transaction delineation descriptions, a transaction combination to analyze, or the status of analyzed transaction combination merges (e.g., successful, failed). In addition, transaction analysis database 106 contains historical information, for repetitively executed queries, related to the status of previously analyzed transaction combination merges (e.g., successful, failed).

DBMS 108 is representative of various open-source (e.g., Apache Cassandra®, HBase®) or proprietary (e.g., Netezza®, Clustrix®) database management systems capable of processing database queries from client computer 120 or other computing devices connected to network 110. Database 104 is a database that is accessed or manipulated by DBMS 108. DBMS 108 includes a plurality of internal functions (not shown). A non-exhaustive list of the internal functions of DBMS 108 are scheduler, parser, transaction manager, concurrency control, file methods, and access methods.

Transaction merge algorithms 109 is a collection of rules (e.g., transaction patterns, action priorities, etc.) and procedures to merging at least two transactions, wherein each transaction has at least two ordered operation steps. In one embodiment, computer 102 sets a merge algorithm, from transaction merge algorithms 109, as the default merge algorithm. For example, the merge algorithm operates on pairs of transactions and employs a rule that states a "write" operation is followed by a "commit" operation. This "write" operation within a first transaction is combinable with a "read" operation to the same database table by a different transaction. In another embodiment, a reaction threshold changes the default merge behavior of computer 102. For example, additional merge algorithms or compatible rules from different merge algorithms are employed to increase the number of transactions and merged transaction combinations that further merge to form another merged transaction combination.

TMP program 300 analyzes database queries (e.g., query 127 received from client computer 120) and identifies transactions within a query, described in a particular manner, for subsequent merging. TMP program 300 analyzes the identified transactions, within a query, and proposes two or more transactions that can be combined. In one embodiment, TMP program 300 tests the proposed transaction combinations and merges the transaction combinations that pass. In another embodiment, TMP program 300 uses historical data from repetitively executed database queries (e.g. query 128 received from client computer 120), previously processed by TMP program 300, and stored in transaction analysis database 106, to improve the responsiveness of DBMS 108 to subsequent database queries for query 128. Additionally, TMP program 300 verifies the integrity of the current query by checking which transactions are included in merged combination and which transactions are processed by DBMS 108 implementing MVCC. TMP program 300 transfers the merged transaction to merged transaction analysis (MTA) program 400 for execution and analysis.

MTA program 400 processes information related to the merged transaction combinations, both successful and failed, created by TMP program 300. The information is stored in transaction analysis database 106. MTA program 400 interfaces with DBMS 108 to process the successfully merged transaction combination. MTA program 400 interfaces with DBMS 108 to revert to standard MVCC and processes the unique instances of unexecuted operations or transactions that comprise failed merged transaction combinations.

Data storage 115 is persistence storage which can be a stand-alone unit, part of a storage area network (SAN), part of a network attached storage (NAS) system, virtualized storage on a computing cluster, or a shared partition where the user of client computer 120 can store additional information to be accessed by computer 102, such as transaction delineation definitions. Alternatively, computer 102 may store non-query related information on data storage 115 to be accessed by client computer 120. For example, a listing of the transaction delineation definitions supported by DBMS 108.

Client computer 120 may be a laptop computer, a tablet computer, a netbook computer, a personal computer (PC), a desktop computer, a personal digital assistant (PDA), a smart phone, or any programmable computer system known in the art. In certain embodiments, client computer 120 represents a computer system utilizing clustered computers and components (e.g., database server computers, application server computers, etc.) that act as a single pool of seamless resources when accessed through network 110, as is common in data centers and with cloud-computing applications. In general, client computer 120 is representative of any programmable electronic device or combination of programmable electronic devices capable of executing machine readable program instructions and communicating with client computers, such as computer 102 or data storage 115 via network 110. Client computer 120 may include components as depicted and described in further detail with respect to FIG. 6, in accordance with embodiments of the present invention.

Client computer 120 includes software application 123 (application 123), application programming interface (API) 125, database query 127 (query 127), and database query 128 (query 128).

Software application 123 (application 123) is a software program that interacts with databases (e.g., database 104) on computer 102 via network 110. In one example, application 123 is the client-side interface for an e-commerce software application and interacts with inventory and billing databases on computer 102. In another example, application 123 is a mapping application that presents the user with a list of businesses (e.g., restaurants) within a specific distance of the user and the directions to locate each business. In various embodiments, application 123 can be any software program capable of interacting and communicating with computer 102 via network 110.

Application programming interface (API) 125 specifies a set of functions or routines that accomplish one or more specific tasks or interacts with a specific software application (e.g., application 123). API 125 interacts with application 123 to produce database queries (e.g., query 127, query 128) and communicate through network 110 to access DBMS 108 on computer 102. In one embodiment, API 125 is a Web API that interfaces application 123 with a web browser. In another embodiment, API 125 is a collection of plug-ins to facilitate mobile banking transactions (e.g., an encryption module, a security certificate module, etc.).

Query 127 and query 128 are database queries created by application 123 and API 125, executing on client computer 120, to transfer or access information in database 104 on computer 102 via network 110.

FIG. 2 depicts a sample database query (e.g., query 127), created, by application 123, incorporating transaction delineation definitions, in accordance with an embodiment of the present invention. Table 1 and table 2, discussed below, describe the steps executed by a database management system using protocols, known to one skilled in the art, on a simplified version of the output of the example database query depicted in FIG. 2. Table 3, discussed below, is comprised of the steps and actions taken by DBMS 108 incorporating an embodiment of the present invention responding to a simplified version of the output of the example database query depicted in FIG. 2.

Statement 200 initiates the communication to form the connection to a database. The database query depicted in FIG. 2 is based on Java® database connectivity (JDBC®) (e.g., a Java®-based data access technology) directed to database TEST.TESTTAB (e.g., database 104); however, embodiments of the present invention may be implemented using any data access technology.

Statement 201 is a command to deactivate auto-commit mode. In some database management systems, when a connection is created, auto-commit mode is active by default. Each individual structured query language (SQL) statement is treated as a transaction and is automatically committed right after it is executed. For example, the transaction created by SQL statement 210 executes immediately upon create rather than waiting for the query that incorporates SQL statement 212 and initiated by commit 214.

In this exemplary embodiment, comment 202 outlines the transaction delineation definitions (TDD) to identify three primary transactions and a transactional qualifier. The three primary transactions are read 203 (read of a database object), write 205 (write of a database object), and commit 206 (commit transactions). Additionally, "SELECT" within statement 210 is an SQL command that acts as a READ. "UPDATE" within statement 212 is an SQL command that acts as a WRITE.

Transactional qualifier (TQ) 204, employed in this exemplary embodiment of the current invention, is "o" (i.e., optional). TQ 204 identifies a transaction that may be subject to an additional query condition or interaction. In a scenario, if a TDD had this structure, oW(tab1) oW(tab2) C, an example of the logic conditions within a query step may be, IF(cond== true) THEN Write(tab1); ELSE Write(tab2); Commit. An additional primary transaction is "roll-back" (not shown). Roll-back is an operation which returns the database to the previous state, undoing any operations of the transactions. In an embodiment, the implementation of roll-back as an "explicit" transaction abort is embedding roll-back within a query, by the software application programmer. In an example, before application 123 and database 104 can be deployed, the software application programmer tests the functionality of API 125. The software application programmer forces the query to produce "fails" at specific transactions for the purpose of debugging application 123 or database 104 (e.g., application program knows that there are some problems). In another example, the roll-back transaction is linked to a logical condition (e.g., roll-back IF(resource1 availability==false).

Table 1 demonstrates the effects of implementing the strict two-phase locking (S2PL) on database TEST.TESTTAB (e.g., DB2®-like database). Referring to Table 1, in step 1 transaction T1, and in step 2 transaction T2 respectively, obtain shared locks in preparation to execute SELECT (e.g., read), in steps 3 and step 4 respectively, for data from database 104. SELECT (e.g., read) triggers table scans of database 104. Prior to UPDATE in step 8, T1 requires an exclusive lock (e.g., write-lock). In step 5, to acquire the exclusive lock for T1, DBMS 108 analyzes the deadlock between T1 and T2 and kills (e.g., aborts) T2. For example, the timestamp for T1 is older than the timestamp for T2 so DBMS 108 aborts the younger transaction. In step 6, T1 obtains the required exclusive lock for the subsequent update. In step 7, T2 is re-initiated, and T2 requests a shared lock. However, the shared read-lock for T2 is blocked until the exclusive lock to T1 is released after the commit in step 9. In step 8, T1 triggers a table scan as part of the UPDATE (e.g., write) to database 104. Once the committed action (e.g., UPDATE) of T1 completes at step 9, the request by T2 for a shared-lock is granted by DBMS 108 in step 10. Without further conflicts affecting T2, DBMS 108 completes steps 11, 12, 13, and 14 resulting in two more table scans.

TABLE 1

Concurrent transactions executing using S2PL (Classical approach)

| Step | Actions |
|---|---|
| 1 | T1: get shared lock for table TEST.TESTTAB |
| 2 | T2: get shared lock for table TEST.TESTTAB |
| 3 | T1: table scan for SELECT COUNT(*) |
| 4 | T2: table scan for SELECT COUNT(*) |
| 5 | T1: apply for exclusive lock for table TEST.TESTTAB -- Deadlock; wait until DBMS kills younger transaction and T2 gets re-started -- |
| 6 | T1: get exclusive lock for table TEST.TESTTAB |
| 7 | T2: apply for shared lock for table TEST.TESTTAB -- DBMS makes sure T2 waits until T1 gives back exclusive lock -- |
| 8 | T1: table scan for UPDATE (optionally supported by index structure) |
| 9 | T1: commit |
| 10 | T2: get shared lock for table TEST.TESTTAB |
| 11 | T2: table scan for SELECT COUNT(*) |
| 12 | T2: get exclusive lock for table TEST.TESTTAB |
| 13 | T2: table scan for UPDATE (optionally supported by index structure) |
| 14 | T2: commit |

Table 2 demonstrates the effects of DBMS 108 implementing multi-version concurrency control (MVCC) on a database TEST.TESTTAB (e.g., database 104) on a Netezza®-like system. MVCC provides "point in time" consistent views of the database using timestamps as references. Referring to Table 2, in step 1 transaction T1 and in step 2transactions T2 respectively SELECT (e.g., read) data from database 104. The SELECT (e.g., read) triggers a table scan of database 104. Due to the implementation of MVCC, transaction T1 and T2 operate on identical copies of database 104; however, transaction ID for T2 is greater than the transaction ID of T1. In step 3, T1 initiates a table scan as part of the UPDATE (e.g., write) to the database 104. T1 at step 3 triggers a timestamp update to database 104. Two versions of database 104 now exist, a new version and an old version. Subsequent writes affect a future version (e.g., new) of database 104. In step 4, T2 request to initiate as table scan part of the UPDATE (e.g., write). DBMS 108, here, implementing MVCC and executing on a Netezza®-like system, detects the conflict the UPDATE from T2 causes and rolls-back transaction T2 (e.g., resets, delays, reverts). In step 5, T1 is committed and the UPDATE (e.g., write) completes. Once the committed action (e.g., UPDATE) of T1 completes, DBMS 108 restarts T2 in step 6. Without further conflicts affecting T2, DBMS 108 completes steps 7, 8, and 9 resulting in two more table scans.

TABLE 2

Concurrent transactions executing using Netezza ®-like system

| Step | Actions |
|---|---|
| 1 | T1: table scan for SELECT COUNT(*) |
| 2 | T2: table scan for SELECT COUNT(*) T1 is in ignore list of T2 |
| 3 | T1: table scan for UPDATE |
| 4 | T2: asks to do table scan for UPDATE |

TABLE 2-continued

Concurrent transactions executing using Netezza ®-like system

| Step | Actions |
|---|---|
|  | -- Netezza ® detects conflict and rolls-back T2 -- |
| 5 | T1: commit |
| 6 | T2 is restarted |
| 7 | T2: table scan for SELECT COUNT(*) |
| 8 | T2: table scan for UPDATE |
| 9 | T2: commit |

Table 3 depicts the effects of an embodiment of the current invention implemented on a version of DBMS 108 incorporating MVCC on a database TEST.TESTTAB (e.g., database 104). Referring to FIG. 2, the query that produces the simplified list of transactions employs a protocol herein identified as "transaction delineation definitions" (TDD). The TDDs describe the possible operations a transaction can initiate. These TDDs provide an embodiment of the current invention a basis to combine transactions that are compatible (e.g., transaction merge algorithms 109) and analyze for conflicts/cycles (e.g., conflict graph). In some cases, the scheduler slightly offsets the start of a second transaction in time to ensure the completion of a first transaction. In another embodiment, DBMS 108 contains a set of rules to apply to merge algorithms (e.g., transaction merge algorithms 109). By reading the results, the second transaction effectively starts at the point in time that the first transaction commits from the MVCC point of view, thus eliminating one potential serializability problem.

In step 1, DBMS 108 reads in transaction T1 and identifies that T1 will initiate a read (R) and T1 may optionally (o) initiate a write (W). Unlike step 1 and step 2 of table 1 and table 2, DBMS 108 analyzes and reacts to transaction T1 before initiating activity on transaction T2.

TABLE 3

Combined serialized transactions executing using Netezza ®-like system

| Step | Actions |
|---|---|
| 1 | T1: TDD R(testtab), oW(testtab), C |
| 2 | T1: table scan for SELECT COUNT(*) |
| 3 | T2: TDD R(testtab), oW(testtab), C |
| 4 | Merged T1/T2: table scan for UPDATE and SELECT COUNT(*) updated |
|  | -- T2 does not get results yet, as T1 is not yet committed -- |
| 5 | T1: commit |
| 6 | T2: table scan for UPDATE |
| 7 | T2: commit |

Figure 3:
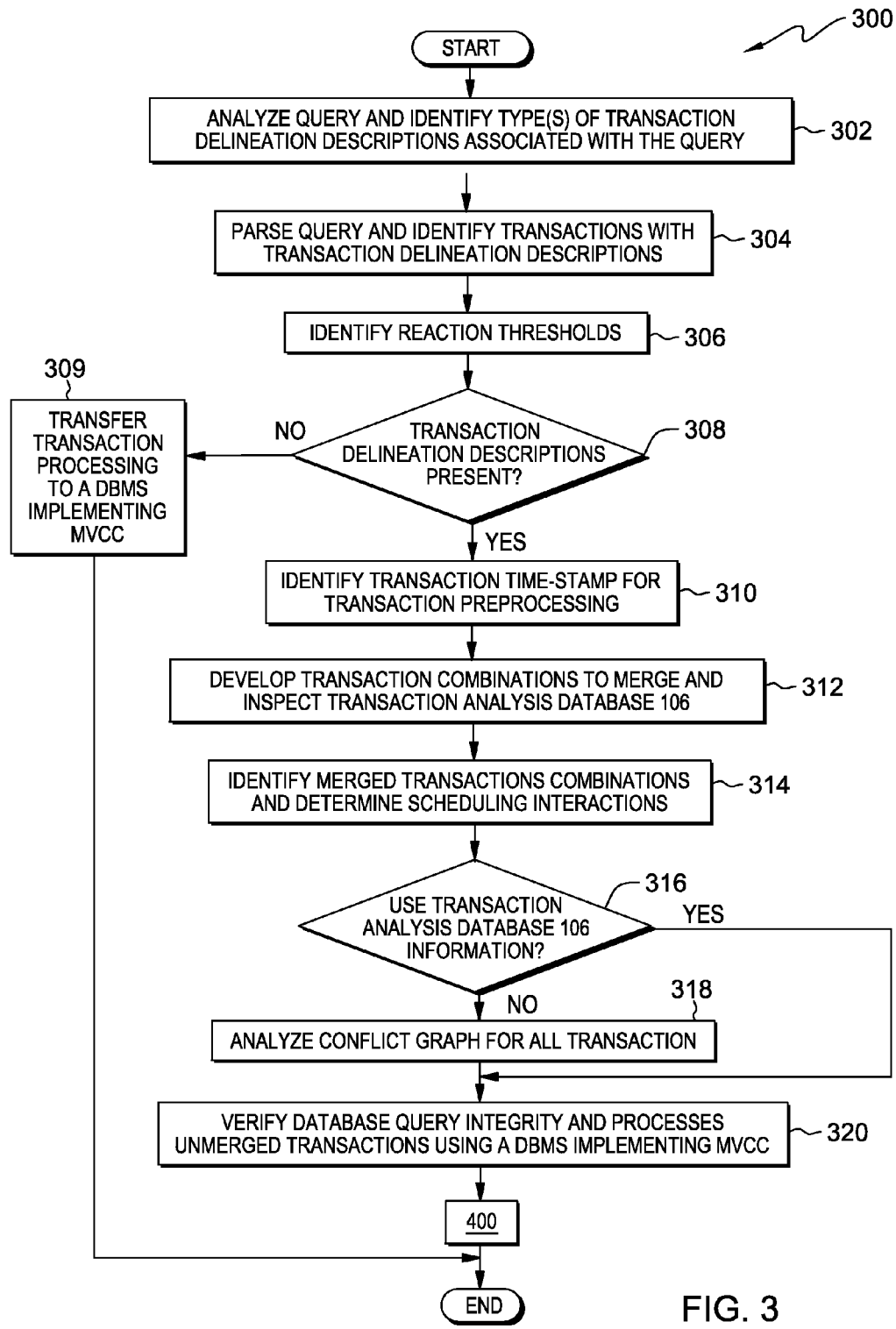
FIG. 3 depicts a flowchart of the steps of a transaction merge preprocessor program, in accordance with an embodiment of the present invention.

FIG. 3 is a flowchart depicting operational steps of transaction merge preprocessing (TMP) program 300, in accordance with an embodiment of the present invention. TMP program 300 executes on computer 102 within distributed data processing system 100 of FIG. 1 to analyze query 127 and query 128, generated by application 123, executing on client computer 120, and directed to database 104. In various embodiments, TMP program 300 accesses the information contained within transaction analysis database 106 and transaction merge algorithms 109.

TMP program 300 analyzes transaction combinations and merges two or more transactions based on a merge algorithm, for example, transaction merge algorithms 109. DBMS 108 can assign a default merge algorithm to be employed by TMP program 300 (e.g., two transactions per merged transaction combination). In one scenario, TMP program 300 analyzes a conflict graph (e.g., precedence graph) and identifies a transaction combination free of conflicts or cycles (e.g., successful). In this scenario, the outcome is produced by an exemplary embodiment of the current invention processing simple transactions. In another scenario, TMP program 300 analyzes the conflict graph and identifies the transaction combinations that create conflicts or cycles (e.g., failed). In an embodiment, TMP program 300 further analyzes merged transaction combinations to determine if additional transactions can be merged with initial merged transaction combinations based on the default merge algorithm. In another embodiment, TMP program 300 inspects transaction analysis database 106 to determine if a previous execution of TMP program 300, for a specific database (e.g., database 104) and database query (e.g. query 128), produced a listing of transaction combinations. In one scenario, the TMP program 300 determines that it is more efficient to cache previously successful merged transaction combinations for query 128, on computer 102, rather than executing transaction merge algorithms and analyzing the conflict graphs. In another scenario, TMP program 300 determines that caching previously successful merged transaction combinations on computer 102 is less efficient than executing transaction merge algorithms and analyzing the conflict graphs. In one instance, however, TMP program 300 determines that identifying successful merged transaction combinations within transaction analysis database 106, for query 128, is more efficient than analyzing the conflict graphs. In another instance, TMP program 300 determines that identifying failed merged transaction combinations within transaction analysis database 106, for query 128, is more efficient than executing transaction merge algorithms and analyzing the conflict graphs.

Referring to FIG. 3, in step 302, TMP program 300 analyzes a query, for example, query 127, and identifies the one or more types of transaction delineation descriptions associated with the query. In one embodiment, TMP program 300 identifies the various TDDs that DBMS 108 supports. The various transaction delineation descriptions that computer 102 supports are stored within transaction analysis database 106. In one scenario, transaction analysis database 106 is located on computer 102. In another scenario, TMP program 300 stores the various transaction delineation descriptions on a shared partition on data storage 115. The shared partition is accessible to application developers to optimize queries for software applications, based on the software language used to write application 123 or API 125. In another embodiment, the user of client computer 120 provides the respective transaction delineation descriptions to computer 102. In one scenario, the user of client computer 120 creates a new database (e.g., database 104).

Client computer 120 transmits query 127 to computer 102 via network 110. Query 127 is created by an application using a "just-in-time" (JIT) compiler; the database query is comprised of machine language. In this instance, the user of client computer 120 provides byte-code definitions of the transaction delineation descriptions to computer 102 prior to executing query 127. In another scenario, query 127 incorporates meta-information identifying the transaction delineation descriptions, which is subsequently extracted from the query and analyzed prior to parsing the query (in step 304). In yet another embodiment, TMP program 300 stores an original version of the query to transaction analysis database 106. TMP program 300 subsequently uses the original version of the query to verify, after execution of TMP program 300, that each transaction is scheduled for execution only once and that no transactions are lost. For example, TMP program 300 identifies which transactions were executed by DBMS 108 using standard controls and which transactions comprise merged transactions.

In step 304, TMP program 300 parses a database query and identifies which transactions can be associated with a transaction delineation description. In one embodiment, TMP program 300 receives a query generated by application 123, executing on client computer 120, via network 110. In one scenario, TMP program 300 identifies which transactions within the query have a transaction delineation description present and which transactions do not have a transaction delineation description present. In another scenario, TMP program 300 identifies which transactions, within the query, have a transaction delineation description known to computer 102 and which transactions contain delineation descriptions unknown to computer 102 (e.g., not listed in transaction analysis database 106). In an example, a user transfers database 104, application 123, API 125, and query 127 to client computer 120 from another computer (not shown) via network 110. In one instance, application 123 is a hybrid software application and as such, query 127 is a combination of human-readable text and byte-code. In this instance, computer 102 processes the transactions that are text based and have text comments identifying the transaction delineation descriptions (e.g., XML code). However, unless the user of client computer 120 updates transaction analysis database 106 with the byte-code transaction delineation descriptions associated with query 127, TMP program 300 cannot process the byte-code transactions within query 127. In another embodiment, the application programmer of application 123 includes transaction delineation descriptions that are abstract, high-level descriptions as part of each query. For example, the application programmer incorporates the abstract, high-level descriptions including transaction start, transaction end, read operation, write operation, etc. within the header of query 127. Referring to FIG. 2, read 203, write 205, and commit 206 comprise defining the transaction delineation descriptions associated with the example query.

In step 306, TMP program 300 identifies one or more reaction thresholds. The reaction thresholds can be based, at least in part, on transaction complexity, number of transactions per merge combination, access to historical data (e.g., transaction analysis database 106), scheduler constraints (e.g., time-slice), resource constraints, and risk constraints. In addition, TMP program 300 identifies whether additional tracking or analysis information is obtained and stored. For example, in step 414 of MTA program 400, as discussed with reference to FIG. 4, MTA program 400 determines a cause for failure of a merged transaction combination. In one embodiment, the selected merge algorithm, e.g., transaction merge algorithms 109, assumes priority over one or more reaction thresholds. For example, the number of operations within a transaction does not affect which transactions are considered for a merged transaction combination as long as the structure of the transaction fulfils (i.e., satisfies) the rules dictated by the selected merge algorithm. In another embodiment, the reaction thresholds associated with the database 104 contain limited historical data for database 104 and associated queries (e.g., no previously merged transactions were identified). In one scenario, database 104 and associated query 127 are initially optimized for speed, and the reaction thresholds are accordingly assigned. In one instance, TMP program 300 determines that blocks of eight or less transactions are selected to create the proposed transaction combinations (in step 314). In another instance, a threshold is set to allow transaction analysis database 106 to be read and merged transactions are not cached. In addition, TMP program 300 treats the successfully merged transaction combinations as a single transaction. Upon a subsequent execution of query 127, a successfully merged transaction combination is combined with a previously unmerged single transaction. In another scenario, database 104 is a large database (e.g., >1 petabyte). The initial reaction thresholds for queries associated with the large database 104 are set at liberal values to maximize transaction merges. TMP program 300 initially assigns more time, assigns more resources, modifies the behavior of the scheduler of DBMS 108 (e.g., chronological ordering disabled), and increases the number of transactions within a merged combination to three or more transactions to maximize the number of transaction merges. Subsequent executions of query 127 access the successfully merged transactions, stored in transaction analysis database 106, and cache the transaction on computer 102. Subsequent queries executed against database 104 execute at an improved performance (e.g., reduced number of table scans).

In a further embodiment, an owner of computer 102 defines the reaction thresholds for queries executed against the databases hosted by computer 102. In one scenario, computer 102 operates in a Platform as a service (PaaS) business model. Computer 102 incentivizes the use of TDDs to create merged transactions. In one instance, computer 102 provides a larger time-slice, for the same price, during peak operation periods for users that prepare queries to include transaction delineation definitions and execute queries utilizing TMP program 300 and MTA program 400. In another instance, computer 102 delays non-transaction merged queries, which are not time sensitive, to execute during off-peak periods. In yet another instance, TMP program 300 communicates with DBMS 108 and identifies the percentage of transactions without TDDs. In the embodiment, DBMS 108 subsequently sends an e-mail to the user outlining the benefits (e.g., incentives) for creating queries containing TDDs. In another scenario, DBMS 108 sets the reaction thresholds as defaults based on the size of the database to be queried. In one instance, DBMS 108's use of TMP program 300 and MTA program 400 is transparent to the users of computer 102. In another instance, DBMS 108 presets the reaction thresholds and allows the user, of client computer 120, to apply a degree of customization to the reaction thresholds.

In decision step 308, if TMP program 300 identifies that a transaction does not have a transaction delineation description present (no branch, decision step 308), then TMP program 300 eliminates the transaction from consideration for transaction merging, and in step 309, TMP program 300 transfers the processing of the transaction eliminated from consideration to a DBMS implementing MVCC. In various embodiments, the DBMS used is DBMS 108, as depicted and described with reference to FIG. 1, employing MVCC and scheduling to process the transactions. In one embodiment, each transaction not handled by TMP program 300 can be processed concurrently with the activities of DBMS 108. In another embodiment, DBMS 108 cannot schedule a transaction returned from TMP program 300 until the results are available for one or more transactions processed by TMP program 300. In one scenario, DBMS 108 waits for the results of a pair of merged transactions that have an older timestamp than the transaction without a transaction delineation description. In another scenario, DBMS 108 detects a conflict associated with the transaction without a transaction delineation description. In one instance, DBMS 108 applies a "roll-back" to the transaction without a transaction delineation description. In another instance, a merged transaction is affected by a delayed transaction without a transaction delineation description. The merged transaction is rolled-back to permit the delayed transaction without a transaction delineation description to execute.

Referring to decision step 308, if TMP program 300 identifies transactions which have a transaction delineation description present (yes branch, decision step 308), then TMP program 300 subsequently identifies transactions from the query for transaction preprocessing (in step 310).

In step 310, TMP program 300 identifies the respective transaction time-stamps for the transactions that contain a transaction delineation description for transaction preprocessing. In one embodiment, TMP program 300 aggregates a group of transactions based on a period of time. In another embodiment, TMP program 300 aggregates a group of transactions based on a number of transactions. In one scenario, TMP program 300 prioritizes the aggregation to the defined number of transactions. In another scenario, the scheduler of DBMS 108 affects the number of transactions in a group. The number of aggregated transactions can vary up to the defined number of transactions based on a time-slice provided by the scheduler of DBMS 108.

In step 312, TMP program 300 develops proposed combinations of transactions to merge. TMP program 300 stores the proposed combinations of transactions in transaction analysis database 106 for subsequent analysis (e.g., conflict graph). Additionally, TMP program 300 inspects transaction analysis database 106 for results relating to previous executions of the current query. In one scenario, TMP program 300 uses the results, located in transaction analysis database 106, for previous executions of the query 128, to determine if proposed transaction combinations need analysis as discussed in step 318. In another scenario, TMP program 300 retrieves known successful transaction combinations for query 128 from transaction analysis database 106 and caches the transaction combinations on computer 102. In yet another scenario, TMP program 300 flags transaction combinations that are capable of creating integrity verification failures. TMP program 300 eliminates the flagged transaction combinations from inclusion when developing merged transaction combination.

In one embodiment, TMP program 300 employs transaction merge algorithms 109 to determine and create the proposed combinations of transactions to merge. FIGS. 5a and 5b are illustrative examples of merged transactions related to various embodiments of the current invention. The merge algorithms employed (e.g., transaction merge algorithms 109) by DBMS 108, executing on computer 102 to enable TMP program 300 to develop merged transaction combinations for queries received via network 110 from application 123, executing on client computer 120.

In a scenario, write and commit operations can be preceded by the TQ "optional" (O). In one example, referring to Table 4, transaction 1 (T1) is comprised of six ordered transaction steps. For example, transaction steps such as read and write act on an element of the database, usually that which is indicated within curved parentheses ( ). For relational databases, the element within ( ) are usually tables. Non-relational databases forgo the table form of rows and columns relational databases use in favor of specialized frameworks to store data, which can be accessed by special query APIs. In Table 4, the six ordered transactions steps are read(A1), read(A2), O write(A1), O write(A2) O write(A3), and O commit. In an embodiment of the current invention, a merge algorithm, within transaction merge algorithms 109, employs a first rule (i.e., rule 1.) that states a "write( )" is followed by a "commit". This "write( )" is combinable with a "read( )" to the same database table by a different transaction/operation. A second rule (i.e., rule 2.) is that if multiple "write( )" steps occur, within a transaction, only the "write( )" immediately prior to a "commit" defines the "read( )" that is acceptable for merging from another transaction. In one scenario, transaction merge algorithms 109 applies the rules of the merge algorithm for the current embodiment to the transactions described in Table 4. In one instance, T1 cannot combine (e.g., merge) with T2. T1 ends with a write(A3) whereas T2 begins with a read(A1). In another instance, T1 cannot combine with T4. T1 ends with a write(A3) whereas T4 begins with a read(A2). In another scenario, T1 and T3 are merge candidates, or T3 and T4 are merge candidates. Either pair of transactions (e.g., T1+T3, T3+T4) passes both the first and second rules of an embodiment of transaction merge algorithms 109. An exemplary implementation of an embodiment of the current invention, employing the second rule, is depicted and discussed with reference to line 501 and line 502 of FIG. 5a.

TABLE 4

Example transactions for exemplary embodiments expanded to three transaction merges

| Step | Transaction T1 | Transaction T2 | Transaction T3 | Transaction T4 |
|---|---|---|---|---|
| 1 | read(A1) | read(A1) | read(A3) | read(A2) |
| 2 | read(A2) | O write(A2) | O write(A2) | O write(A2) |
| 3 | O write(A1) | O commit | O commit | O commit |
| 4 | O write(A2) | | | |
| 5 | O write(A3) | | | |
| 6 | O commit | | | |

Referring to FIG. 3, in a further embodiment, at process step 312, a merged transaction combination is merged with yet another transaction. In one scenario, referring to Table 4, transaction T1 and T3 were combined into the proposed transaction combination T(1+3). T(1+3) is subsequently combined with T4 creating the proposed transaction combination T((1+3)+4). In another scenario, transaction T3 and T4 were combined into the proposed transaction combination T(3+4). T(1) is subsequently combined with T(3+4) creating the proposed transaction combination T(1+(3+4)). Either pairing of a combination and a transaction creates a merged transaction with steps depicted and discussed in FIG. 5.

In a different embodiment, TMP program 300 applies a different algorithm, for example, another of transaction merge algorithms 109, with another set of rules, which may include one or more rules from another merge algorithm. One scenario relates to actions on multiple, closely related tables. One or more rules that is applied to this scenario can be:
  1. In a set of transactions being merged, only one transaction is writing.
  2. There are no reads between a write and the end of the transaction.
  3. Multiple writes may merge with subsequent multiple reads if transaction executions are allowed to be delayed until commits for the respective predecessor transactions initiate.
  4. No transaction to be merged with a writing transaction is allowed to do a write or a commit before the writing transaction commits, and the merged transaction is aborted in the case where the writing transaction aborts.

In one instance, referring to exemplary depiction of transaction steps in FIG. 5a, TMP program 300 uses timestamps (e.g., chronological order) provided by the scheduler, within DBMS 108, to combine and merge transaction T1, T3, and T4 listed in Table 4. Chronological, ordering and combining (e.g., merging) transactions and transaction steps for T1, T3, and T4, results in an eight step proposed combination transaction. In another instance, referring to exemplary depiction of transaction steps in FIG. 5b, TMP program 300 employs another embodiment of the merge algorithm in which the ordering of transactions is based on write/read pairings with the execution of transactions delayed until commits occur. For example, T1.0 write(A2) and T4.read(A3) are merged employing rule 4) above as depicted in FIG. 5b line 520. In another example, the other embodiment of the algorithm incorporates adjusting the effective start time for the reading transaction to the commit time of the writing transaction, normal MVCC employed. Write/read pairings and combining (e.g., merging) transactions and transaction steps for T1, T3, and T4 results in a ten step proposed combination transaction.

Still referring to step 312 of FIG. 3, in yet another embodiment, DBMS 108 determines that a query executes without inspection of transaction analysis database 106 and caching (in step 314). TMP program 300 restricts operations to proposing transaction combinations and analyzing the combinations for cycles and conflicts (in step 316). In one scenario, once one or more transaction is selected from the group of transactions to create a proposed combination to merge, the one or more transactions is removed from the group of transactions (e.g., sampling without replacement). In another scenario, transactions that are selected from the group of transactions to create one proposed combination to merge are available for reuse in a different proposed combination (e.g., sampling with replacement). In this scenario, TMP 300 subsequently verifies integrity of the query (e.g., no duplicated transactions). In another embodiment, TMP program 300 inspects transaction analysis database 106 for stored instances of transaction merges associated with previous executions of query 127 against database 104. In one scenario, TMP program 300 identifies transaction combinations that produced failed merges. In one instance, TMP program 300 flags the identified combinations that produced failed merges and reverts the respective transactions, in the current execution of query 127, to standard processing by DBMS 108. In another instance, TMP program 300 proposes alternative transactions combinations that incorporate different portions of the failed merge combination.

In step 314, TMP program 300 identifies the merged transaction combinations associated with a query and determines if scheduling interactions exist. In one embodiment, if TMP program 300 determines that scheduling interactions exist, the TMP program 300 does not access transaction analysis database 106 and proceeds to step 318. In another embodiment, TMP program 300 determines that no significant scheduling interactions exist. In one scenario, TMP program 300 has a large enough time-slice from the scheduler to identify known successful merged transaction combinations within transaction analysis database 106 for previous executions of the current query. TMP program 300 flags the successful merged transaction combinations so that the successful merged transaction combinations are not analyzed (e.g., conflict graph) in step 318. In addition, if TMP program 300 has sufficient time to identify failed transaction combinations, within transaction analysis database 106, for previous executions of the current query, TMP program 300 flags the failed combinations so that the failed combinations are neither analyzed (e.g., conflict graph) in step 318 nor subsequently executed as a merged transaction combination. In another scenario, TMP program 300 determines, from statistical analysis and historical data for various databases and database queries that, based on the time-slice available from the scheduler of DBMS 108, that the available time-slice allows a subset of known successful and failed merged transaction combinations to be identified. Only the subset of known successful and failed merged transaction combinations are not analyzed (e.g., conflict graph) in step 318.

In a further embodiment, TMP program 300 determines, from statistical analysis and historical data for various databases and database queries (e.g. query 128), that based on the time-slice available from the scheduler of DBMS 108 and lacking scheduling interactions, that transaction caching is possible. TMP program 300 retrieves known successful merged transaction combinations, associated with a repetitive query, from transaction analysis database 106. Based on the information stored in transaction analysis database 106, TMP program 300 may improve the efficiency of DBMS 108, executing a repetitive query, by caching known successful merged transaction combination and by eliminating the development of merged transaction combinations and subsequent conflict graph analysis.

In decision step 316, TMP program 300 determines whether to use the information obtained from transaction analysis database 106. If TMP program 300 determines that no information was obtained from transaction analysis database 106 (no branch, decision step 316), then TMP program 300 transfers the merged or unmerged transactions for subsequent conflict graph analysis (in step 318).

If TMP program 300 determines that information was obtained from transaction analysis database 106, and that information contains the flags identifying successful or failed merged transaction combination (yes branch, decision step 316), then TMP program 300 by-passes conflict graph analysis (in step 318) for the flagged transaction combinations and proceeds to step 320.

In step 318, TMP program 300 analyzes the conflict graph for all transactions, merged transaction combinations, and unmerged transactions. In one scenario, TMP program 300 determines, from the analysis of the conflict graph, that a merged transaction combination is successful and flags the merged transaction combination as successful for subsequent inclusion in transaction analysis database 106. In another scenario, TMP program 300 determines, from the analysis of the conflict graph, that the merged transaction combination failed (e.g., demonstrated a conflict, showed one or more cycles) and flags the merged transaction combination as failed successful for subsequent inclusion in transaction analysis database 106.

In step 320, TMP program 300 verifies the integrity of the query and processes the unmerged transactions using a DBMS implementing MVCC (e.g., DBMS 108). In one embodiment, TMP program 300 verifies that all the transactions within a query are uniquely handled. Each transaction within the original query either is executed via standard DBMS 108 controls or exists within one and only one merged transaction. In one scenario, TMP program 300 identifies two or more merged transactions that contain one or more duplicate transactions. In one instance, TMP program 300 identifies the unique transactions within the two or more merged transactions, flags the combinations as violating the integrity check in transaction analysis database 106, and transfers processing of the unique transactions or operations to a DBMS implementing MVCC (e.g., DBMS 108). In another instance, TMP program 300 flags the combinations as violating the integrity within transaction analysis database 106. In another embodiment, TMP program 300 checks transaction analysis database 106 for other transaction combinations incorporating the unique transactions. In one scenario, TMP program 300 replaces the two or more merged transactions with different combinations of transactions. TMP program 300 re-analyzes the different combinations of transactions and reverifies the integrity of the query. TMP program 300 transfers the processing of unmerged transactions to DBMS 108. In another scenario, TMP program 300 determines the query fails the integrity check due to one or more missing transactions. TMP program 300 recovers the one or more missing transactions and responds to the recovered transactions as if the recovered transactions are unmerged transactions, processing the transactions via a DBMS implementing MVCC.

Figure 4:
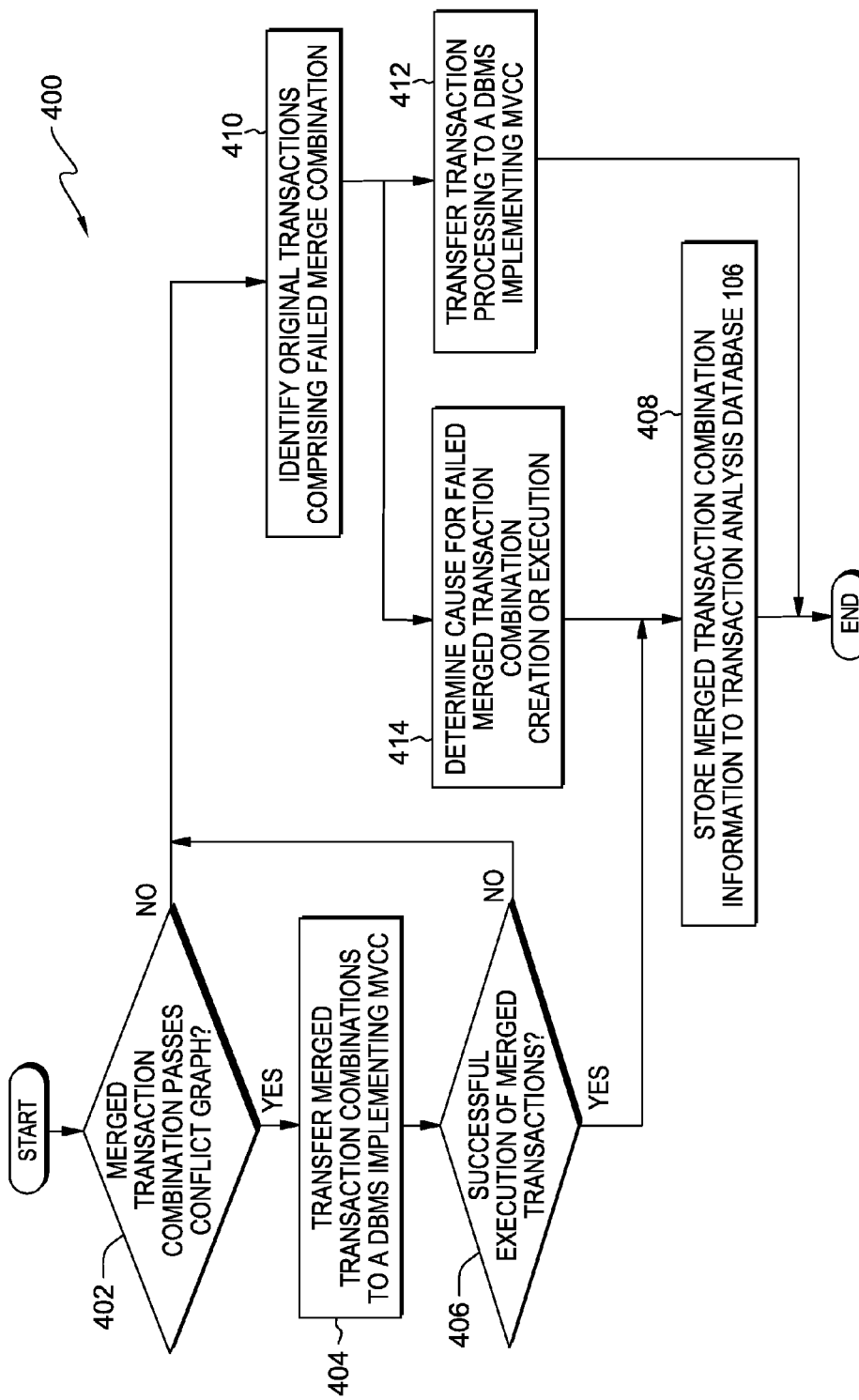
FIG. 4 depicts a flowchart of the steps of a merged transaction analysis program, in accordance with an embodiment of the present invention.

FIG. 4 is a flowchart depicting operational steps of merged transaction analysis (MTA) program 400. Merged transaction analysis (MTA) program 400 executes on computer 102 within distributed data processing environment 100 of FIG. 1 to analyze query 127 and query 128, generated by application 123, executing on client computer 120, directed to database 104.

In one embodiment, in decision step 402, MTA program 400 determines which merged transaction combinations are flagged as successful (e.g., passed the conflict graph analysis) and subsequently executes the merged transactions (step 404). If MTA program 400 determines that a merged combination has passed the conflict graph analysis (yes branch, decision step 402), then MTP program 400 subsequently transfers the merged transaction combination to DBMS 108 for execution. In one embodiment, the successful determination is based on the flag assigned at step 318 of the current execution of the query. In another embodiment, the flag identifying a successful merged transaction combination is provided by transaction analysis database 106 based on a previous execution of the query.

In step 404, MTA program 400 transfers the merged transaction combinations to DBMS 108. DBMS 108 executes the merged transaction combination. In decision 406, MTA program 400 identifies whether execution of the merged transaction combination is successful. In one embodiment, MTA program 400 monitors DBMS 108 for the results of the execution of the merged transaction analysis combination. In another embodiment, MTA program 400 waits for DBMS 108 to provide the results of the execution of the merged transaction analysis combination.

In decision step 406, if MTA program 400 determines that the execution of the merged transaction combination was successful (yes branch, decision step 406), then in one embodiment, MTA program 400 flags the merged transaction combination as a successful execution and saves the results in transaction analysis database 106 (in step 408). In another embodiment, MTA program 400 receives an indication from DBMS 108 that the result of the merged transaction combination are not saved to transaction analysis database 106 (in step 408). For example, the results are from a database under development and may not reflect the behavior of the deployed database.

Referring to decision step 402 and decision step 406, if MTA program 400 determines either the merged transaction combination failed the conflict graph analysis (no branch, decision step 402), or the merged transaction combination failed during execution on DBMS 108 (no branch, decision step 406), then MTA program 400 subsequently identifies the original transactions that comprise the failed merged transaction combination. In one scenario, the failed execution of the merged transaction combination is associated with a roll-back. In another scenario, the failed execution of the merged transaction combination is associated with an abort (e.g., connectivity problem).

In step 410, MTA program 400 identifies the original transactions that comprise the failed merged transaction combination and passed the integrity check to prevent transaction duplication. In addition, MTP program 400 has knowledge of which transactions within a merged transaction combination that successfully executed. For example, in a two transaction merge combination, if the merged transaction failed, the first operation can succeed, but the second operation is rolled-back. In one embodiment, TMP program 400 identifies the transactions that comprise the merged transaction combination from the merged transaction itself. For example, the merged transaction combination is comprised of two relatively simple transactions, refer to T3 and T4 of Table 4, and chronological order was maintained. In another embodiment, TMP program 400 identifies the transactions that comprise the merged transaction combination based, at least in part, on information contained in transaction analysis database 106 and the scheduler of DBMS 108. For example, the query depicted in FIG. 5b fails execution. With reference to FIG. 5b, the sequence of steps the merged transaction combination did not have chronological order maintained. The transactions which comprise T4, in FIG. 5b, are split between step 4 (line 520) and step 8 (line 522) by transactions comprising T3 (e.g., line 523 and line 525). Unlike the query depicted in FIG. 5a where transactions that comprise T4 are generally sequential, lines 502 and lines 503, separated by a T3.0 commit, complies with rule 1.

In step 412, MTA program 400 transfers the original or remaining transactions that comprise the failed merged transaction combination to DBMS 108 and reverts the execution of the original transactions to a DBMS implementing MVCC (e.g., DBMS 108) and scheduling control. In an embodiment, a merged transaction combination passed the conflict graph analysis but failed during the execution of an operation within the merged transaction combination. For example, at least the first operation within the merged transaction combination executes prior to the failure of the merged transaction combination. In the example, a timing issue causes the failure of the merged transaction combination. However, after a roll-back is applied to the failed operation by the MVCC protocol, the merged transaction combination continues to execute.

Additionally, in another embodiment, MTA program 400 determines the cause of the failure of the merged transaction combination creation or the failure of the merged transaction combination execution (in step 414). In one scenario, MTA program 400 identifies the cause of the failure is associated with the conflict graph analysis. TMP program 300 previously flagged the merged transaction combination as a failure. MTA program 400 subsequently stores merged transaction combination information to transaction analysis database 106. In another scenario, MTA program 400 determines that the failure was associated with the execution of the merged transaction combination. MTA program 400 subsequently stores merged transaction combination information to transaction analysis database 106. In yet another scenario, MTA program 400 determines that the failure of the merged transaction combination is related to a connectivity issue with database 104. In an instance, MTA program 400 determines that the failure of the merged transaction combination (e.g., created by query 128) is timing related and stores, in transaction analysis database 106, the determination that a longer time delay is needed from the scheduler within DBMS 108 for subsequent executions of the affected merged transition combination.

Figure 6:
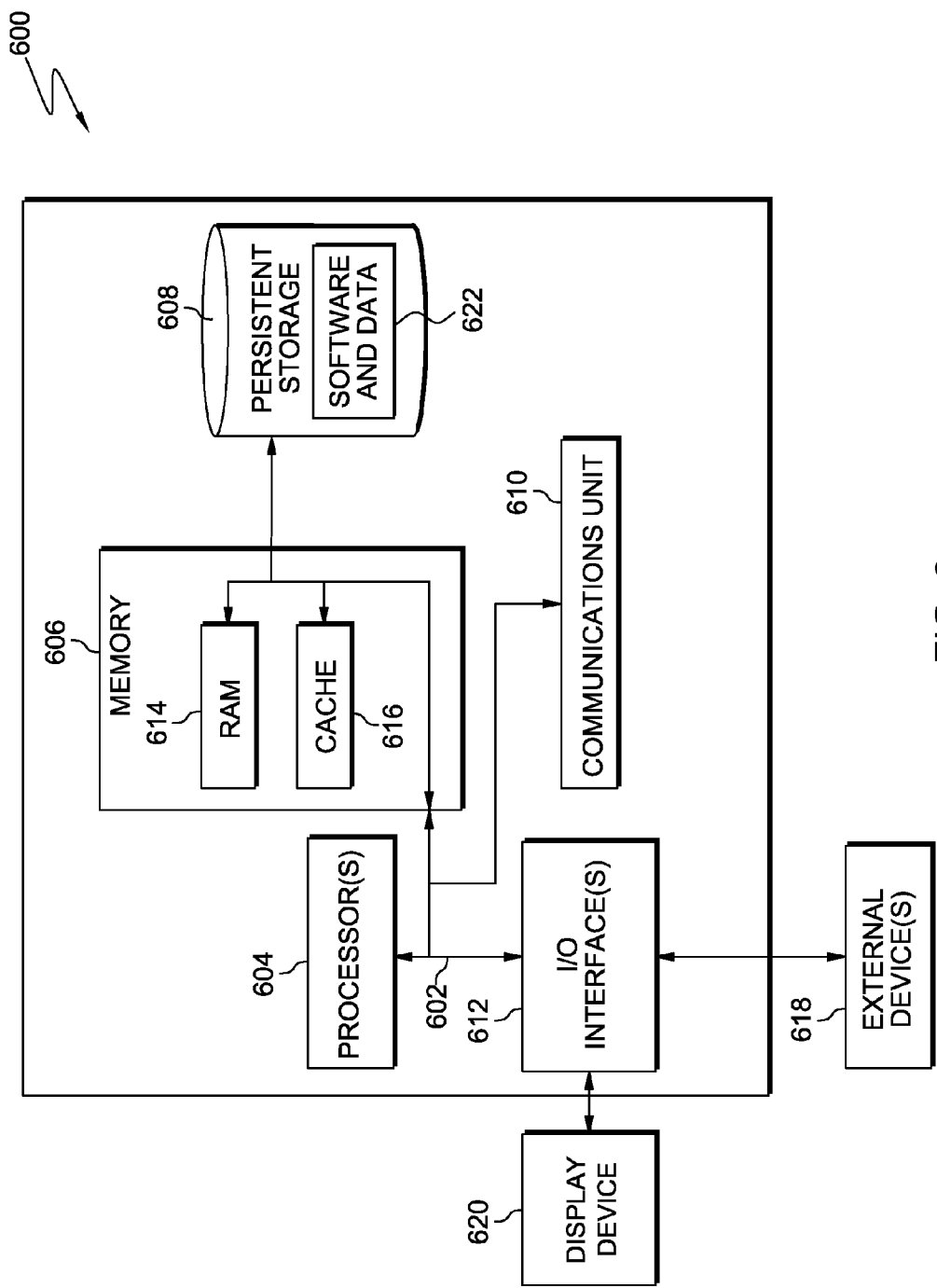
FIG. 6 is a block diagram of components of a computer, such as the computer of FIG. 1, in accordance with an embodiment of the present invention.

FIG. 6 depicts a block diagram of components of computer 102 or client computer 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media. Software and data 622 are stored in persistent storage 608 for access and/or execution by processors 604 via one or more memories of memory 606. With respect to client computer 120, software and data 622 includes application 123, API 125, query 127, and query 128. With respect to computer 102, software and data 622 includes database 104, transactional analysis database 106, database management system (DBMS) 108, transaction merge algorithms 109, transaction merge preprocessor (TMP) program 300, merged transaction analysis (MTA) program 400, and various system and database monitoring programs (e.g., cycle and dependency graph calculations) (not shown).

In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information. In an alternate embodiment, data storage 115 is persistence storage which can be a stand-alone unit, part of a storage area network (SAN), part of a network attached storage (NAS) system, or virtualized storage on a computing cluster.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of client computer 120, computer 102, and data storage 115. In these examples, communications unit 610 includes one or more network interface cards. Communications unit 610 may provide communications through the use of either or both physical and wireless communications links. Software and data 622 may be downloaded to persistent storage 608 through communications unit 610.

I/O interface(s) 612 allows for input and output of data with other devices that may be connected to computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data 622 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor. Display 620 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for merging transactions for execution by a database management system, the computer program product comprising:
   one or more computer readable storage media and program instructions stored on the one or more computer readable storage media, the program instructions comprising:
   program instructions to receive a database query, wherein the database query containing a plurality of transactions, and wherein receiving the database query
   includes placing each of the plurality of transactions, in respective chronological order, in a scheduling queue;
   program instructions to determine at least a first transaction and a second transaction within the plurality of transactions each contains one or more transaction delineation descriptions; and
   program instructions to respond to a determination that the first transaction and the second transaction within the plurality of transactions each contains one or more transaction delineation descriptions, and program instruction to merge the first transaction and the second transaction to create a merged transaction combination, wherein merging combines two or more table-scan operations.

2. The computer program product of claim 1, further comprising:
   program instructions to determine whether the first transaction and the second transaction occur relatively sequentially in the scheduling queue, wherein relatively sequentially is based, at least in part, by a time-slice dictated by a database scheduler.

3. The computer program product of claim 1, wherein merging further comprises:
   program instructions to determine whether the first transaction and the second transaction satisfy one or more merge rules, based, at least in part, on meta-information comprising the transaction delineation descriptions;

program instructions to respond to a determination that the first transaction and the second transaction satisfy a one or more merge rules, and program instructions to order one or more operations comprising the first transaction and the second transaction, based at least in part, on at least one merge rule, to create the merged transaction combination;

program instructions to determine whether the merged transaction combination passes a conflict graph analysis;

program instructions to respond to a determination that the merged transaction combination passes the conflict graph analysis, and program instructions to replace the first transaction and the second transaction in the scheduling queue with the merged transaction combination; and program instructions to schedule the merged transaction combination for execution by the database management system, wherein the database management system employs multi-version concurrency control.

4. The computer program product of claim 3, wherein merging combines at least two transactions such that the at least two transactions execute in serial order.

5. The computer program product of claim 3, further comprising:

program instructions to determine that the merged transaction combination fails the conflict graph analysis; and program instructions to respond to a determination that the merged transaction combination fails the conflict graph analysis, and program instructions to maintain the first transaction and the second transaction in the scheduling queue.

6. The computer program product of claim 1, further comprising:

program instructions to identify an aggregation of transactions within the scheduling queue, wherein each transaction of the aggregation of transactions contains one or more transaction delineation descriptions; and program instructions to select two or more transaction from the aggregation of transactions to be subsequently merged to form the merged transaction combination.

7. The computer program product of claim 1, wherein merging further comprises:

program instructions to determine whether a transaction within the plurality of transactions does not contain a transaction delineation description; and program instructions to respond to a determination that a transaction within the plurality of transactions does not contain transaction delineation descriptions, and program instructions to schedule the transaction, without modification, for execution by the database management system.

8. The computer program product of claim 1, wherein the program instructions are executed within at least one of a massively parallel computing architecture, a distributed computing environment, and a computing cluster.

9. A computer system for merging transactions for execution by a database management system, the computer system comprising:

one or more computer processors;

one or more computer readable storage media;

program instructions stored on the computer readable storage media for execution by at least one of the one or more computer processors, the program instructions comprising:

program instructions to receive a database query, wherein the database query containing a plurality of transactions, and wherein receiving the database query includes placing each of the plurality of transactions, in respective chronological order, in a scheduling queue;

program instructions to determine at least a first transaction and a second transaction within the plurality of transactions each contains one or more transaction delineation descriptions; and program instructions to respond to a determination that the first transaction and the second transaction within the plurality of transactions each contains one or more transaction delineation descriptions, and program instruction to merge the first transaction and the second transaction to create a merged transaction combination, wherein merging combines two or more table-scan operations.

10. The computer system of claim 9, wherein the computer system is at least one of a massively parallel computing architecture, a distributed computing environment, and a computing cluster and wherein the database management system employs multi-version concurrency control.

* * * * *